(12) United States Patent
Boccon-Gibod

(10) Patent No.: US 11,178,261 B1
(45) Date of Patent: Nov. 16, 2021

(54) DEVICE COMMUNICATION TECHNIQUES

(71) Applicant: Fitbit, Inc., San Francisco, CA (US)

(72) Inventor: Gilles Luc Jean Francois Boccon-Gibod, San Francisco, CA (US)

(73) Assignee: Fitbit, Inc., San Francisco, CA (US)

(*) Notice: Subject to any disclaimer, the term of this patent is extended or adjusted under 35 U.S.C. 154(b) by 0 days.

(21) Appl. No.: 16/803,660

(22) Filed: Feb. 27, 2020

Related U.S. Application Data

(60) Provisional application No. 62/890,887, filed on Aug. 23, 2019.

(51) Int. Cl.
*H04L 29/06* (2006.01)
*H04W 4/80* (2018.01)
*H04W 72/04* (2009.01)

(52) U.S. Cl.
CPC ............... *H04L 69/22* (2013.01); *H04W 4/80* (2018.02); *H04W 72/04* (2013.01)

(58) Field of Classification Search
CPC ......... H04L 69/22; H04L 45/00; H04L 29/06; H04W 4/80; H04W 72/04
USPC ................ 455/452.1, 466, 414.1, 455
See application file for complete search history.

(56) References Cited

U.S. PATENT DOCUMENTS

| | | | | |
|---|---|---|---|---|
| 7,043,467 | B1* | 5/2006 | Milito | H04L 29/06 706/45 |
| 8,824,546 | B2 | 9/2014 | Coulombe | |
| 2003/0053481 | A1* | 3/2003 | Abiru | H04L 29/06 370/465 |
| 2005/0102525 | A1* | 5/2005 | Akimoto | H04L 63/0428 713/187 |
| 2006/0039349 | A1 | 2/2006 | Samuel | |
| 2016/0173450 | A1 | 6/2016 | Mircescu | |
| 2016/0381633 | A1 | 12/2016 | Chen | |
| 2017/0063690 | A1* | 3/2017 | Bosshart | H04L 69/22 |
| 2017/0187828 | A1 | 6/2017 | Soji | |
| 2017/0257372 | A1 | 9/2017 | Meriac | |
| 2017/0295083 | A1 | 10/2017 | Brooks | |
| 2019/0033845 | A1 | 1/2019 | Cella | |
| 2019/0045427 | A1 | 2/2019 | Logan | |

OTHER PUBLICATIONS

Non-Final Office Action received in U.S. Appl. No. 16/867,346, dated Jan. 25, 2021.
Non-Final Office Action received in U.S. Appl. No. 16/867,852, dated Jan. 6, 2021.

* cited by examiner

*Primary Examiner* — John J Lee
(74) *Attorney, Agent, or Firm* — Dority & Manning, P.A.

(57) ABSTRACT

Values of fields for a packet header can be analyzed to determine whether those values match default or expected values for those fields. If so, those values can be excluded or removed from the packet header. Flags are set to indicate whether or not a value is included for a given field, and if not then the default value should be used for that field. This compression helps to reduce the packet size, or at least allow for larger payloads within a minimum packet size. Approaches also provide for bi-directional communication capability, including the ability to initiate sessions from different devices, as well as to discovering other devices available for communication. Compression can also be used with address mapping to allow for address translation at the packet level, enabling multiple devices to communicate over a wireless channel that otherwise does not allow for concurrent communication sessions.

20 Claims, 9 Drawing Sheets

DEVICE COMMUNICATION TECHNIQUES

CROSS-REFERENCE TO RELATED APPLICATIONS

This application claims priority to U.S. Provisional Patent Application No. 62/890,887, filed Aug. 23, 2019, and entitled "Communication and Connection Techniques," which is hereby incorporated herein by reference in its entirety and for all purposes.

BACKGROUND

Wireless communication capability is increasingly being incorporated into a variety of devices. A given device might be able to communicate with a number of other devices using a number of different communication protocols. Some of these devices may be small footprint or limited capability devices that are only able to use transmission protocols with limited bandwidth or security. Further, in some situations it may be difficult to communicate with a number of devices concurrently using the same protocol.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of communications between devices. In some embodiments, compression can be performed to headers of communication packets to be transmitted over a wireless channel. For one or more fields that are not required for a packet header, a determination can be made as to whether there is a default or expected value for a given field, which may correspond to an agreed-upon or previous value, among other such options. If the value for a header field matches the default value for a given packet, then that value can be excluded from the header. Flags can be set for various header fields to indicate whether or not a value is included for a given field, and if not then a default value should be used for that field. Such an approach helps to reduce packet size, or at least allow for larger payloads within that packet size. Such approaches also provide for bi-directional communication capability, including the ability to initiate sessions from different devices, as well as to discovering other devices available for communication. A default value compression approach can also be used with address mapping to allow for address translation at the packet level, enabling multiple devices to communicate over a wireless channel that otherwise does not allow for concurrent communication sessions.

Various other functions can be implemented within the various embodiments as well as discussed and suggested elsewhere herein.

Figure 1:
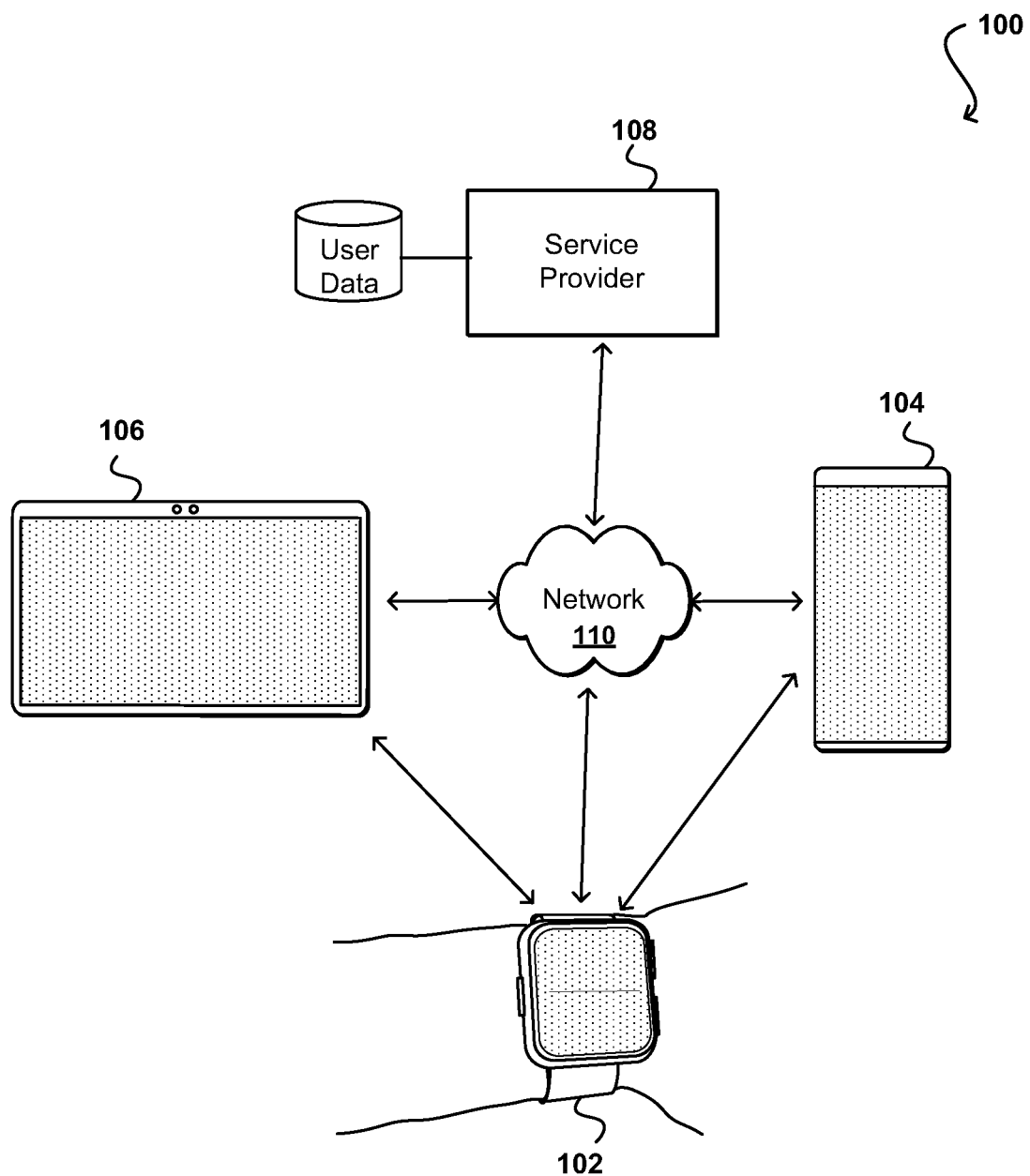
FIG. 1 illustrates an example environment in which aspect of various embodiments can be implemented.

FIG. 1 illustrates an example environment 100 in which aspects of various embodiments can be implemented. In this example, a user might have a number of different devices that are able to communicate using at least one wireless communication protocol. In this example, the user might have a smartwatch 102 or fitness tracker, which the user would like to be able to communicate with a smartphone 104 and a tablet computer 106. The ability to communicate with multiple devices can enable a user to obtain information from the smartwatch 102, such as heart rate data captured using a sensor on the smartwatch, using an application installed on either the smartphone 104 or the tablet 106. The user may also want the smartwatch 102 to be able to communicate with a service provider 108, or other such entity, that is able to obtain and process data from the smartwatch and provide functionality that may not otherwise be available on the smartwatch or the applications installed on the individual devices. The smartwatch may be able to communicate with the service provider 108 through at least one network 110, such as the Internet or a cellular network, or may communicate over a wireless connection such as Bluetooth® to one of the individual devices, which can then communicate over the at least one network. There may be a number of other types of, or reasons for, communications in various embodiments.

In addition to simply being able to communicate, the user may also want the devices to be able to communicate in a number of ways or with certain aspects. For example, the user may want communications between the devices to be secure, particularly where the data may include personal health data or other such communications. The device or application providers may also be required to secure this information in at least some situations. The user may want the devices to be able to communicate with each other concurrently, rather than sequentially. This may be particularly true where pairing may be required, as the user may prefer that each device be paired at most once, or that not manual pairing is required. The user may also desire the communications to be as standards-based as possible, not only so that little manual intervention is required on the part of the user but also so that the devices can communicate with as many other types of devices as possible, which is often not the case for various proprietary formats. A user may thus desire to be able to walk in a room with one device and have it automatically be able to communicate with another target device with little to no effort on the part of the user.

In various conventional approaches, a device will utilize a communication technology such as Wi-Fi to communicate with other devices using wireless local area networking (WLAN). Smaller or lower capacity devices, such as many Internet of Things (IoT) devices, instead utilize a communication technology such as Bluetooth®, and in particular Bluetooth Low Energy (BLE) that has very low power consumption. In order to achieve this low rate of power consumption with respect to technologies such as Wi-Fi, however, BLE has relatively limited transmission range, bandwidth, and data transmission capabilities. BLE was designed to send small packets or "chunks" of data, such as for data captured by a sensor on an IoT device. For the smartwatch 102 of FIG. 1, BLE can be used to transmit information, such as user heart rate data captured by at least one sensor (or other such mechanism) in the smartwatch, to the user's smartphone 104 for tracking or other such usage. It may be desirable to transmit this information to the larger and more powerful smartphone for a number of different reasons, such as improved analysis capability and storage capacity, and ability to transmit over a network to a service provider 108, among other such options.

Figure 2:
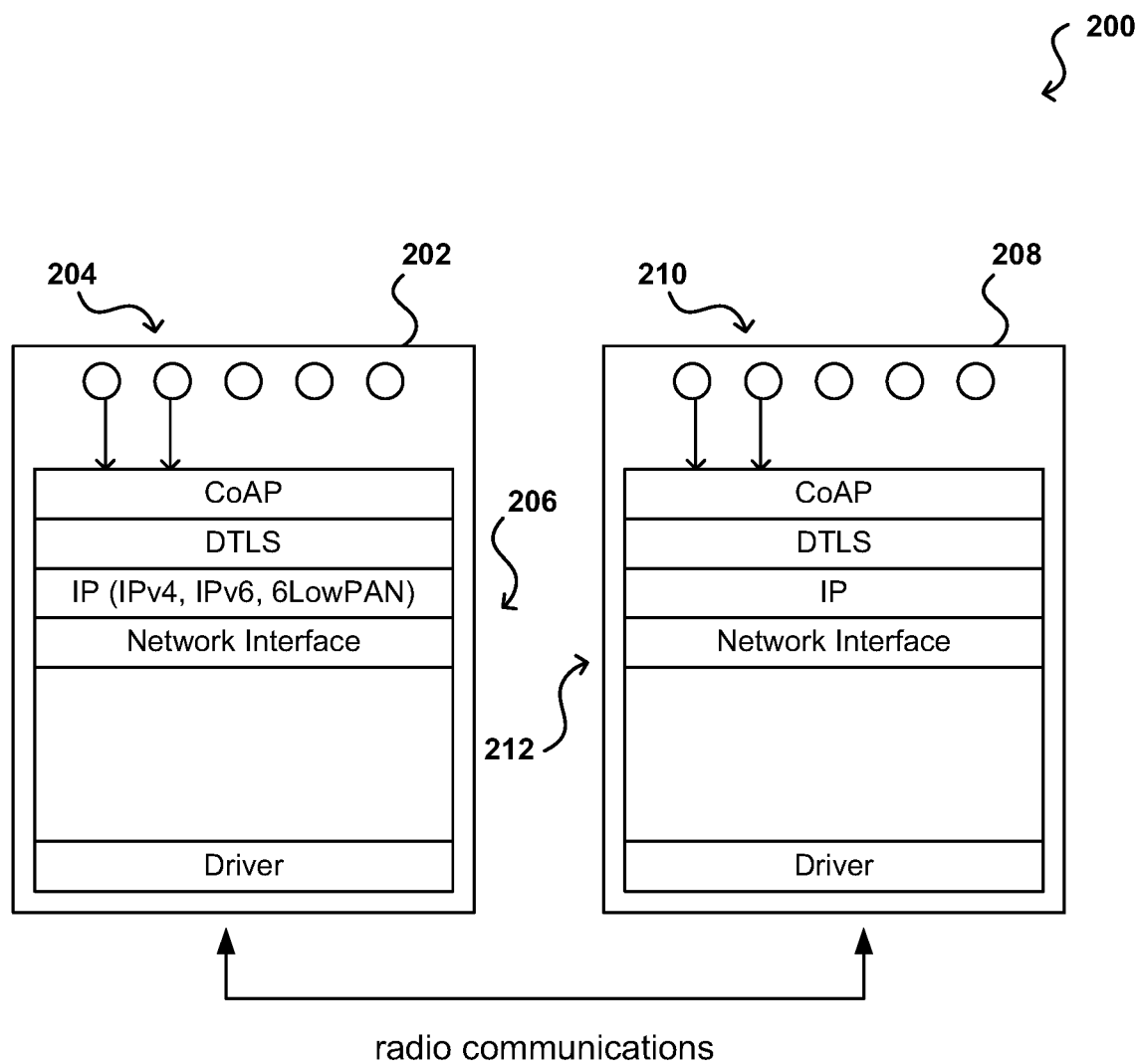
FIG. 2 illustrates an example set of devices that are able to communicate in accordance with various embodiments.

FIG. 2 illustrates an example configuration 200 wherein a first device 202 is able to communicate with a second device 208 using radio communications, in accordance with at least one embodiment. In this example, the radio communications can utilize a technology such as Bluetooth for bi-directional data transfer. The devices can connect and communicate via Bluetooth using a conventional discover and pair approach in at least one embodiment. Applications on the first device 202 that want to communicate with the second device 208 can send a request, for example, through one or more application programming interfaces (APIs) 204 to a network stack on the device. In this example, the devices communicate using a low power, lossy network (a "constrained" network) such that a protocol such as the Constrained Application Protocol (CoAP) can be used for a service layer of the stack. A protocol such as CoAP is well suited for Internet communications, and can provide aspects such as low overhead, multicast support, and simplicity of operation that are advantageous for IoT and other such devices. CoAP is able to run on devices that support the User Datagram Protocol (UDP). The CoAP layer in this example sits on a Datagram Transport Layer Security (DTLS) protocol layer that can provide security for communications from the applications 204 using, for example, Transport Layer Security (TLS). Other standards-based protocols can be used as well in other embodiments. DTLS utilizes UDP communications in at least some embodiments. Many conventional IoT devices utilize DTLS as the security protocol for CoAP communications. The CoAP or other application protocol layer can sit on a routing layer, which in this case is an Internet Protocol routing layer. The protocol may be IPv4 or IPv6 in some embodiments, which provides identification and location support for devices on an IP-based network, which can be used to route communications and data traffic across that network. In at least one embodiment IPv6 over Low-Power Wireless Personal Ares Networks (6LowPAN) can be used to allow lower power and/or capacity devices to transmit information wirelessly using IP. Other technologies such as ZigBee can be used as well in other embodiments. The routing layer can sit on a network interface layer, such as may include interfaces for networks of communications such as Wi-Fi, Ethernet, Bluetooth, and the like. Communications passing through the stack 206 on the first device 202 can be sent over a radio communications channel, such as Bluetooth, and received to a second device 208. The communication will pass through a similar stack 212 on the second device 208 to be received to one or more applications executing on the second device 208. The applications on the second device can use one or more APIs 210 to access the stack. As illustrated in FIG. 2, the stacks and corresponding configuration on the devices are symmetric so that either device can make a request to the other device without either device acting in a master or slave role. While proprietary technologies can be used as well for any of the components illustrated, such approaches can be costly and not widely adopted or trusted, such that in at least one embodiment an attempt is made to use standards-based technologies where appropriate.

In at least one embodiment, the IP layer of the stack is a local IP stack that can send IP packets through the respective network interface. The network interface takes the IP packet and sends it through a transport, which in this case relates to Bluetooth communications. There may be a Bluetooth stack on the device as well, and an operating system on the device may expose an API (not illustrated) to access the Bluetooth functionality. The driver layer in this example may include or expose an API for accessing Bluetooth or other radio functionality.

In a conventional approach, a General Attribute Profile (GATT) API is utilized that defines the way in which two BLE devices transfer data using services and characteristics. GATT communications are considered to be exclusive, in that a BLE device can only be connected to a single device, such as a smartphone or tablet, at any given time. As soon as a BLE device connects to another device, that BLE device will stop advertising such that other devices will not be able to discover and connect with the BLE device until an existing connection to the single device (e.g., smartphone) is broken. GATT uses services to break data into logic entities and contain specific chunks of data or "characteristics." Each characteristic can encapsulate a single data point, which may correspond to an array of related data in some instances. Services and characteristics are all associated with individual identifiers, such as unique UUIDs, which can each be 16-bit for BLE services. Characteristics can also have values associated therewith that indicate permissions for the value, such as whether it can be read or written.

A GATT packet will have a maximum size, such as is specified by the Maximum Transmission Unit (MTU). The implementation of the Bluetooth stack can be a key factor in determining the GATT MTU on the various devices in at least some embodiments. The MTU in various Bluetooth-based embodiments is a value that is at least 23 bytes in length. Thus, when data is received to be transmitted, the data must be broken into chunks so it can be transmitted in packets that are, at most, of the MTU in size. It should be noted that some of the length of the packet corresponds to header information that is to be used for routing, as well as for reassembling the data from the packets received on the other device.

Figure 3A:
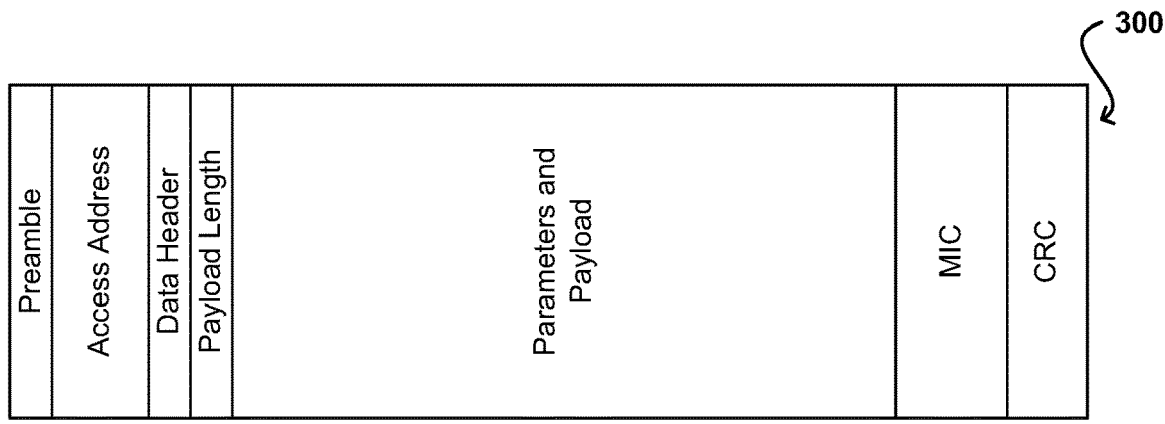
FIGS. 3A, 3B, 3C, and 3D illustrate an example packet compression approach that can be utilized in accordance with various embodiments.

FIG. 3A illustrates an example packet 300 that can be transmitted in accordance with various embodiments. This packet includes various required fields, as well as a payload section, which can hold up to 20 bytes of user data in at least one embodiment. The example packet includes a header field and an access address field, which typically occupy 1 and 4 bytes, respectively. A data header field and a payload length field follow, followed by the parameter and payload field for storing user data (or other data) to be transmitted. Following the payload are a Message Integrity Check (MIC) field and a Cyclic Redundancy Check (CRC) field to ensure integrity of the data contained in the packet.

There are various challenges to transferring data between devices using such an approach. For example, a device can only be connected to a single other device at any given time as discussed previously. Further, dividing the data into sufficiently small packets can be challenging. Further, the stacks and software are complicated and there are a number of handoffs between technologies from different entities so it can be difficult to recover from data corruption or other such issues. Various other complications can arise from such a system as well.

Accordingly, approaches in accordance with various embodiments can provide for packet management in a way that provides at least some additional level of control. Approaches can provide for the serializing and reliable transfer of data packets. These approaches can provide for packet compression, which can improve performance. Such approaches can also provide for address mapping and translation, which can enable a device to communicate concurrently with multiple external devices using the same protocol. Various other advantages are obtained as well as discussed and suggested in more detail elsewhere herein.

In at least one embodiment, either of two devices can initiate a handshake. Once the handshake is completed successfully, a first device can send a packet to the second device and the second device can respond. This initial set of communications can enable the devices to agree on information for a communication session on which packets of data can be sent back and forth. As mentioned, the symmetric nature of various embodiments enables either device to initiate the handshake. In conventional TCP sessions, for example, one side initiates the connection and waits. Approaches in accordance with various embodiments also can manage the session without storing significant state information, such that it is relatively memory efficient.

Figure 3B:
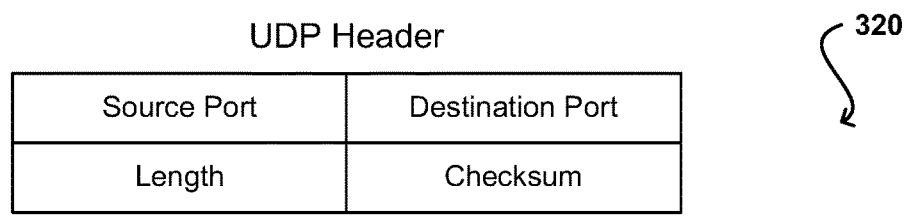
Figure 3C:
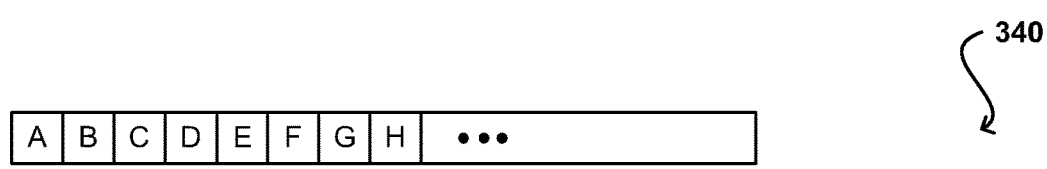

Approaches in accordance with at least one embodiment can also provide for packet compression, which can help to improve performance given limitations on bandwidth and packet size of the various protocols. This can include, for example, IP header compression, where an IP packet header might be 20 bytes in size. FIG. 3B illustrates an example UDP header portion 320, which in and of itself is typically 8 bytes. Thus, even if only 1 byte of data is being sent the packet will still need to include the 20 bytes of header overhead. It is not necessary to send this information in every single packet, however, as at least some of the fields will not change from packet to packet. For example, consider the UDP header 320 of FIG. 3B. The source port and destination port values will generally not change for packets transmitted between the same two devices on the same session. Thus, if the devices can agree upon the default values for these fields, then the values for these fields do not need to be sent with every packet. For example, consider an example packet header 340 illustrated in FIG. 3C. The header includes a number of fields with respective values (A, B, etc.). If it is determined that certain values for certain fields (e.g., B, C, E, F, G) will not change between packets, then these values do not need to be transmitted with every packet. Thus, a header for a subsequent packet may include only values for fields that have not been agreed upon as having been fixed, or having default values. It should be noted that the blank spaces in the header would not represent bytes in the header but are shown for purposes of illustration that certain data values are not included in that header. In this example, it can be seen that values for at least five fields can be determined to be fixed or have default values, and thus do not need to be transmitted. For fields that have at least one byte in size each, this can save at least five bytes per packet.

Figure 3D:
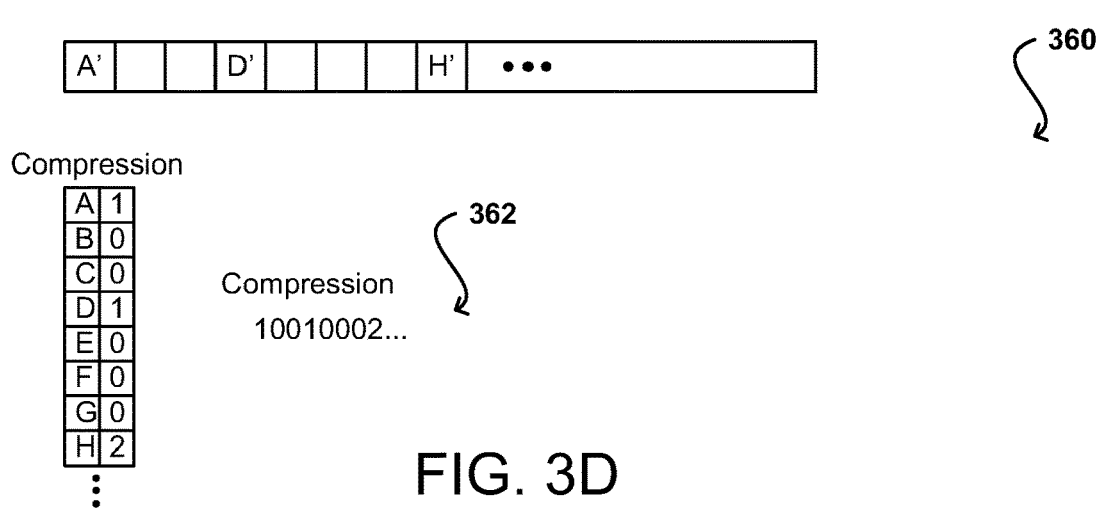

In at least one embodiment, however, each packet can contain an indication as to the fields that are included and/or not included in the packet. This can be useful for situations where one of the previously fixed values might change, or a new value might be determined to be fixed, among other such options. An example data string 362 can be generated, as illustrated in the view 360 of FIG. 3D, that includes a set of flags, which can include one flag for each header field (or at least one flag for each field that is not a required field to be included in each packet). In this example, a mapping can be done to set a flag for each of the fields in the header. A flag of 1 is set for an included field in this example, with a flag value of 0 for fields that do not have values included. This can then be used to generate a single value, say of 16 bits in length for a 16 field header, including a sequence of binary flags. Inclusion of the 16 bit string will still provide significant compression with respect to the five or more bytes of data that are not included in the header. As mentioned elsewhere herein, there may also be multiple possible default, or agreed upon, values that can be utilized for a given field. For example, in the string 362 of FIG. 3D it is illustrated that the value for field H corresponds to agreed-upon value 2. In this case, there may have been at least two possible values for this field that were set as defaults for this field. A transmitting device can then insert a value of 0 in the field to indicate that a receiving device should use a first default value for a non-included field, and a value of 2 in the field to indicate that the receiving device should use a second default value for the non-included field. A value of 1 in this example would still indicate that the receiving device should utilize the value included in the received header field and not use any default value for that field, if otherwise applicable. Other numbering approaches or flags could be used as well, such as 0 to not use a default value, 1 or A to use a first default value, 2 or B to use a second default value, and so on. In some embodiments a single bit in the field might be used to represent a first default value, and two bits used to represent a second default value.

Such an approach is different from general purpose compression in part because this compression scheme depends on the type of data being sent. A general purpose compression scheme can be used on various types of data independent of the type of file, or the data included in that file. A compression scheme in accordance with at least one embodiment is specific to packet headers and whether the values in those fields may change for subsequent packets. This process can also be used to compress IPv4 packets, for which there is not a compression standard such as 6LowPAN for IPv6 packets. In at least one embodiment there are about a dozen fields in an IP packet header. As mentioned, these can include fields for the source address, the destination address, and so on. When a packet is to be transmitted, the compression algorithm can look at the values of the fields and determine whether the values match agreed upon default values for the fields. The default values can include agreed upon default values, most common values, last known values, or other such determinations. If the value for a non-required field in the header is determined to match the default value for that field then a determination can be made to remove that value from the packet header. Based on the determination as to whether or not to include the value, a corresponding flag in the compression header field value can be set, such as 1 for included and 0 for not included. It might then be the case that only three of the values need to be transmitted, along with a string, list, or other indication of the values that are included in the header. When the packet is received by the other side, a decompression algorithm can look to the compression header field value to determine which values are included in the header. The devices will have agreed that the default value should be used for any value that is not included in the header. If a field value is not included, the decompression value can insert the default value in the appropriate field in the header before passing to the destination application. For values that are included, the values should be read from the header and placed into the appropriate field before passing on to the destination application.

For certain protocols or technologies there may be at least some fields that are required and cannot be removed for purposes of packet compression. An IP packet, for example, may need to include at least basic header information identifying it as an IP packet, and may need in some embodiments to include information about the length of the packet, which will not be fixed for all packets. For IPv4 packets, for example, the first three bytes (for the preamble and access address) are required and are not considered for compression in at least one embodiment. Fields that are map-specific can be located after this initial set of header fields but before the payload. In this way, even though the packet header is compressed it will still appear and function as an IP packet. In at least one embodiment the header will include a flag indicating that this is a special type of packet that is to be treated according to rules and/or processes discussed and suggested herein. If a value for a field that is normally fixed differs for a particular packet, then that value can be included in the packet and will take the same amount of space as in a conventional packet, so there is no loss but only potential space gain from such compression approaches.

In the 16 bit string example discussed above, the field string can fit nicely into a two byte field. In a situation where there are 16 possible flags but not 16 fields, the additional space can be used in some embodiments to allow for selection of more than one default value. For example, a set of two bits can be used to determine whether the field has been skipped (e.g., 0,0) or whether to use one of three default values (indicated by bit combinations 0,1; 1,0; or 1,1). This can be useful for parameters such as protocol numbers where there may be more than one fixed value possible.

In some embodiments the default values can be set by an application or agreed upon at session initiation. In other embodiments the first packet sent on a session can have the values stored, and any field not included in a subsequent packet should have the previous field filled in. In this way the devices do not have to agree upon a default value, but may only send values that have changed since the previous packet.

Figure 4A:
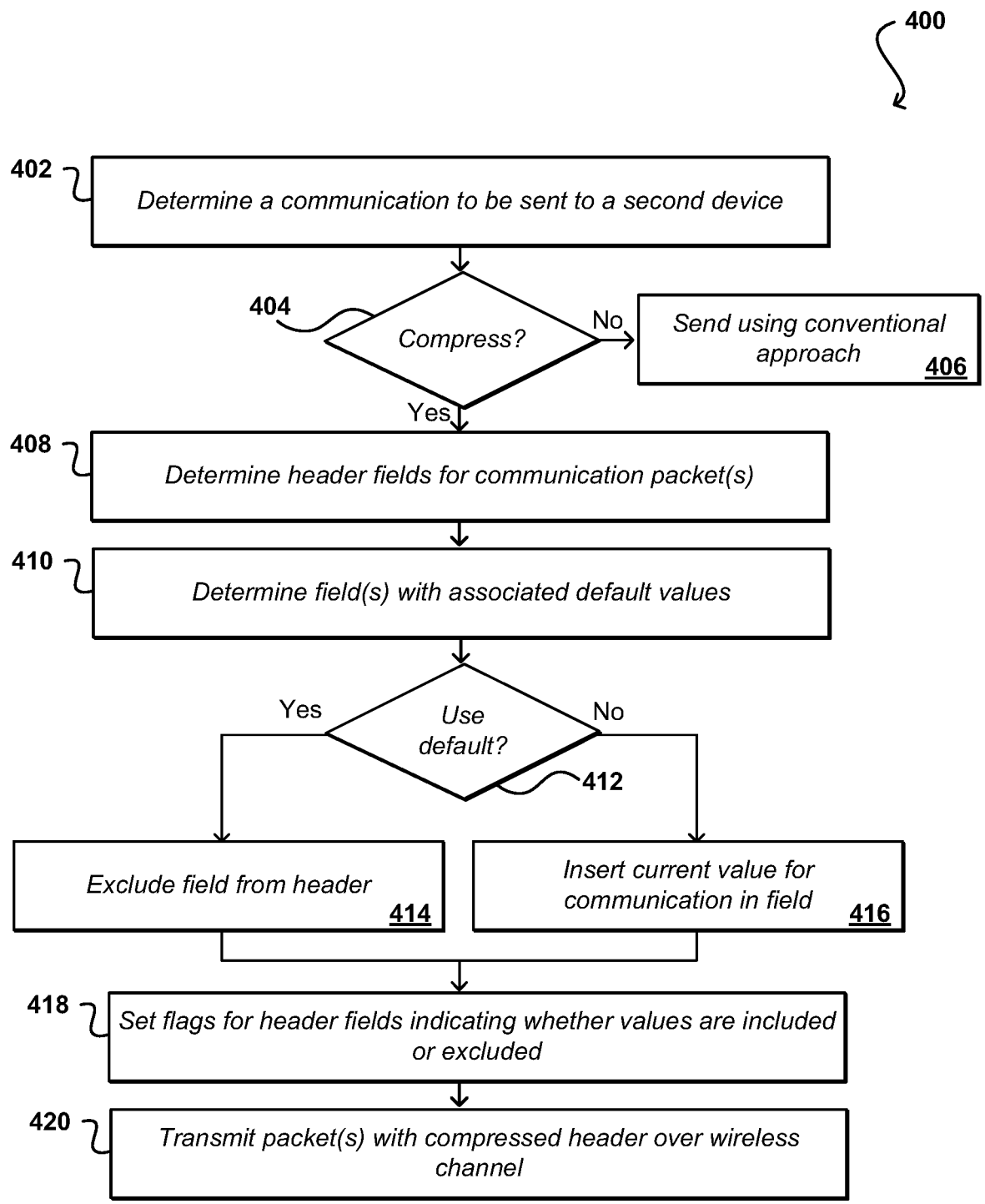
FIGS. 4A and 4B illustrate portions of an example process for compressing packets for wireless communication that can be utilized in accordance with various embodiments.
Figure 4B:
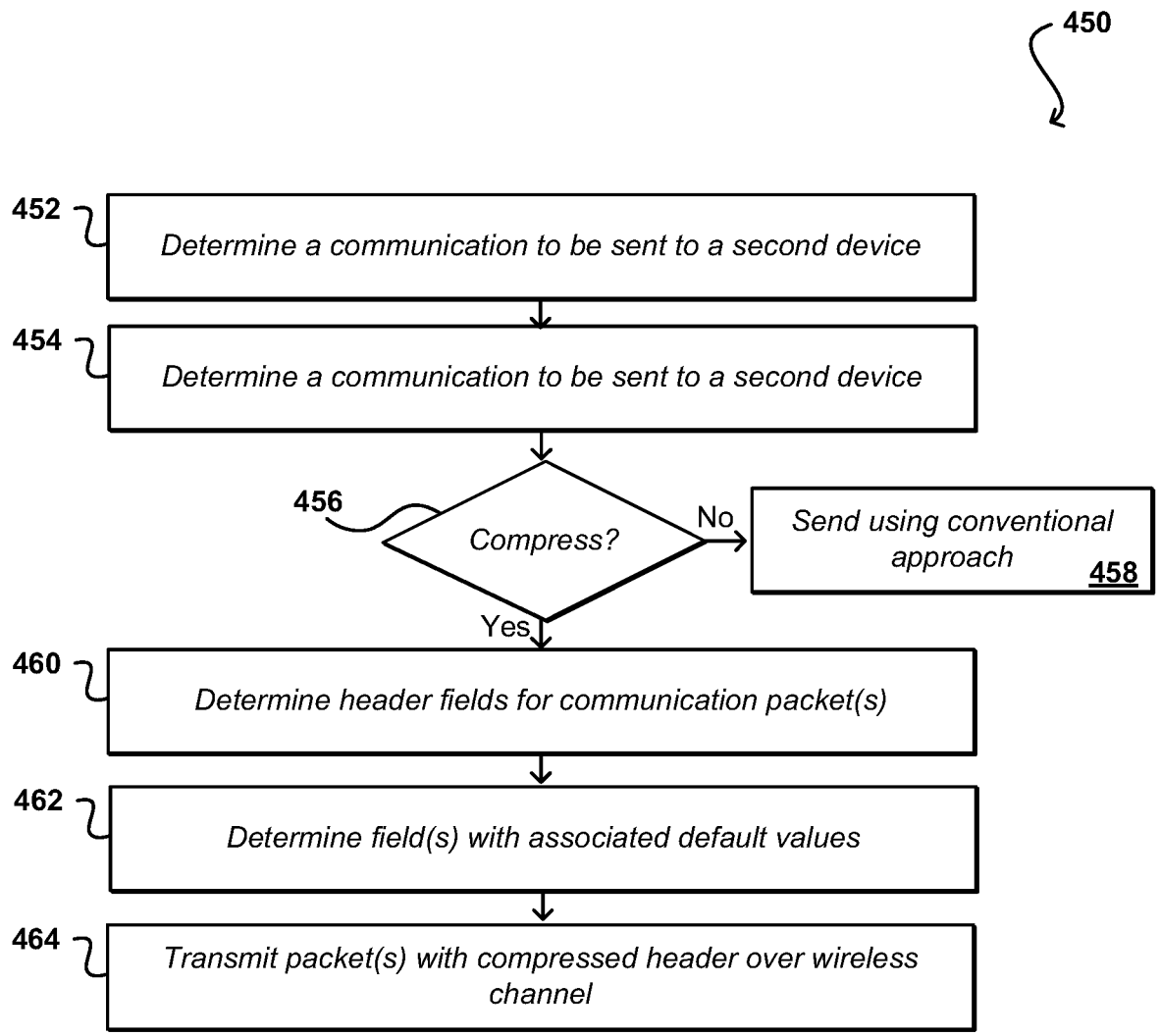

FIGS. 4A and 4B illustrate portions 400, 450 of an example process for performing header compression that can be utilized in accordance with at least one embodiment. In a first portion 400 of the process, a communication is determined 402 that is to be sent to a second device. The communication may be determined in at least some embodiments by being received from an application executing on a device to send the communication, such as by being received to an API exposed by an operating system of the device. A determination can be made 404 as to whether compression is to be applied to the packet, such as where an agreement with the external device was made to use compression at an initiation of the session or as part of a handshaking process, among other such options. If compression is not to be used then the communication can be sent using a general approach, such as may be a default approach used by the device to send communications over a specific wireless channel as discussed herein.

If it is determined that compression should be used, the header fields for the communication packet(s) to be used for the communication can be determined 408, as well as the values to insert in each of those fields. Another determination can be made 410 as to whether any of those fields are associated with default values, such as may have been determined during the initial agreement with the external device in at least one embodiment. For each field that is associated with a default value, the current value can be compared against the default value in order to determine 412 whether to use the default value or a current value associated with this specific communication. If the default value is to be used then the relevant field can be excluded 414 from the header for the relevant packet(s). If the current value does not match the default value, such that the default value should not be used, then the current value can be inserted 416 into the relevant field for the packet(s). A flag can then be set 418 for the various header fields to indicate whether the field has a value included in the header, or whether that field has been excluded and does not include a value, such that the default value should be utilized. As mentioned, this may involve setting a bit in a string that corresponds to that specific field. The packet(s) for the communication can then be transmitted 420 to the target device over a corresponding wireless channel, or other such communication mechanism.

FIG. 4B illustrates another portion 450 of the process that can be utilized in accordance with at least one embodiment. In this example, a packet is received 452 over a wireless channel. This can be, for example, a packet with a compressed header generated as discussed with respect to FIG. 4A. The packet header information can be analyzed 454 and a determination made 456 as to whether the packet has a compressed header per an agreement on the session. If not, the packet can be processed using a general approach, such as the default approach of the operating system as discussed elsewhere herein. If the packet contains a compressed header, the flags in the header can be analyzed 460 to determine which fields have values included and which fields are excluded as having the default (or other agreed upon or previous) value. The values of the excluded fields can be set 462 to the default values, which may be stored in local memory. Information for the packet can then be processed 464 using relevant values for the packet fields as discussed herein. The packet after header decompression should appear as the packet would have appeared without compression in at least one embodiment.

As mentioned, in conventional approaches a device may only be able to communicate with one device at a time using a communication protocol that does not provide for concurrent sessions. Further, in many conventional IP-based systems there is a limited amount of address space (say 32 bit) so there can be a limited number of IP addresses available. IPv6 improves upon this problem, but for IPv4 systems devices can be provisioned between different addresses unless controlled. In order to allow for concurrent device communications, as well as to address limitations in address space, approaches in accordance with at least one embodiment can perform network address translation.

Figure 5:
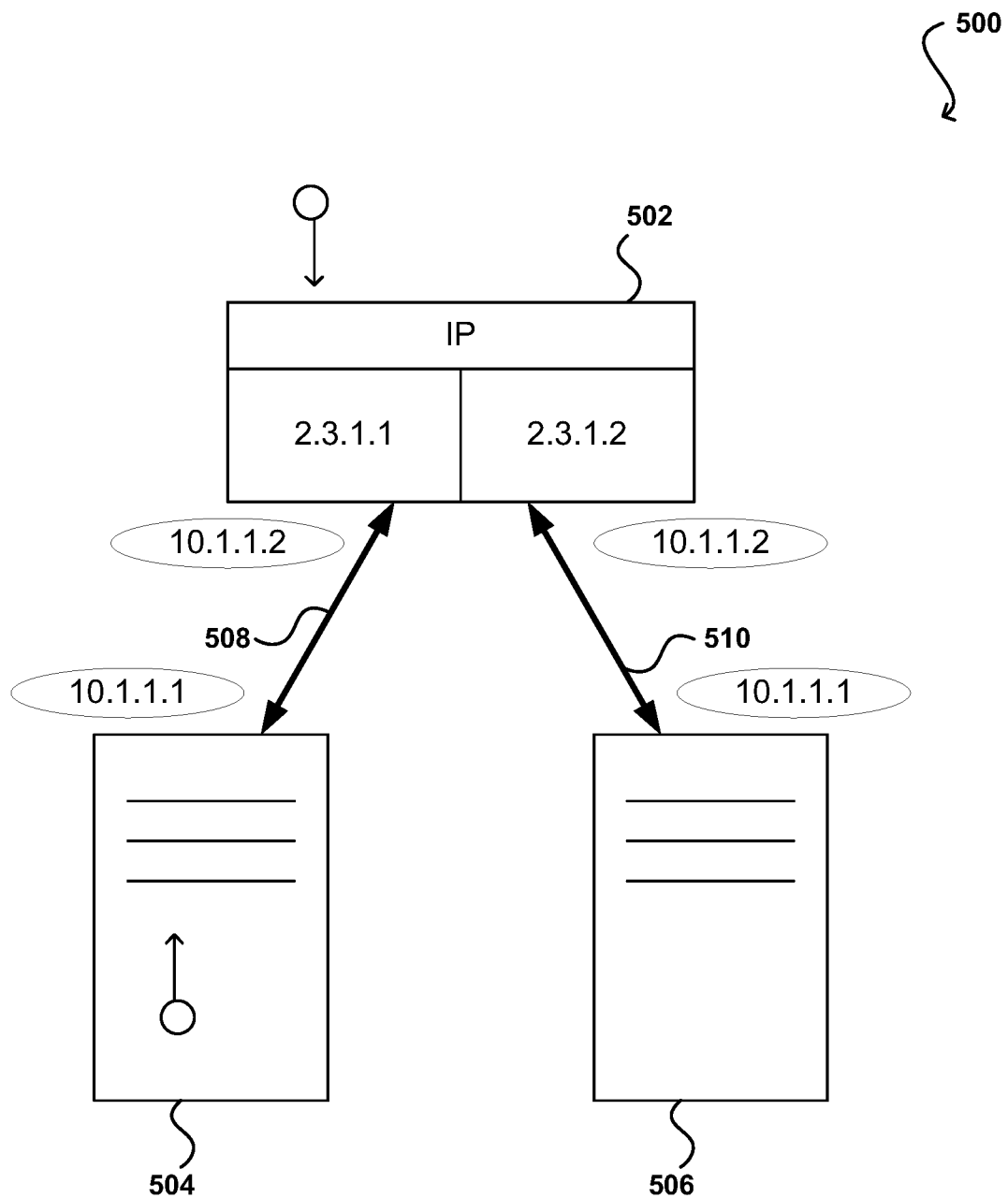
FIG. 5 illustrates an example address mapping approach that can be utilized in accordance with various embodiments.

FIG. 5 illustrates an example address translation approach 500 that can be utilized in accordance with at least one embodiment. Address translation involves mapping addresses on a first side of a translation point to addresses on a second side of the translation point, such that applications executing on the first side can utilize only the first set of addresses without having to know, or even have knowledge of, the second addresses used on the second side. A mapping can be generated and maintain that keeps track of corresponding addresses on the first and second sides of the translation point. As mentioned, it might be the case where it is desirable for a first device, such as a fitness tracker, to be connected to two or more other devices, such as discussed with respect to FIG. 1. As mentioned, those devices do not all communicate with each other concurrently using conventional approaches and are therefore unable to coordinate addresses. Each device will, however, have a fixed notion of an address on their side of a translation point. In the example of FIG. 5, there are two secondary devices 504, 506 communicating with a single primary device 502. In this example the primary device 502 could be the fitness tracker mentioned earlier. If using the same transmission protocol and defaults, the primary device might use the same address (here 10.1.1.2) for bi-directional communications with both devices, and those devices 504, 506 can each have the same assigned address (here 10.1.1.1). Per the protocol, there might only be able to be one connection at a time between the source and destination addresses or ports, etc. Each of the secondary devices 504, 506 would view their respective communications as using the same default source and destination addresses.

For the primary device 502, however, the primary device only has a single IP stack and cannot communicate with two devices having the same IP address, as there will be uncertainty as to which device is to receive which data or communication, or from which device data or a communication is received. In order to allow for these communications with different devices but using the same address information, a remapping can be performed on the primary device 502. In this example, the primary device can assign one of the secondary devices a unique first address (here 2.3.1.1) and a second device a unique second address (here 2.3.1.2), and maintain a mapping such that the translation is performed for transmissions from the primary device to either of the secondary devices 504, 506. Such an approach enables the secondary devices to communicate with the first device as if they are the only secondary device communicating, without having to be aware of the other secondary device or adjust to a different address based upon on the presence of another device. In an embodiment where compression skips default values, this can also be used advantageously as the packets along both communication channels 508, 510 use the same source and destination addresses, which can be set as default values for both and thus excluded from packet headers sent along each channel. This mapping can thus be obtained for free as part of the compression in at least one embodiment, as the default source and destination addresses can be set and agreed upon, which can be different from the IP addresses used by the device. For incoming and outgoing packets, an indication to use the default value can be used, and then each device can fill in the respective default values for a packet. As mentioned, such an approach enables the primary device 502 to communicate with multiple second devices 504, 506 even where the communication protocol does not allow for multiple, concurrent communication sessions.

In at least one embodiment at least some of this functionality can be built into an operating system. Current operating systems and devices do not support this capability, so many devices cannot communicate due in part to the single connectivity limitation. Having the mapping and compression functionality built into the operating system can enable various devices to communicate with a single device using a communication protocol such as BLE. Further, having this built into the OS enables applications to leverage this functionality through an API exposed by the OS, which can greatly simplify application development. Further still, incorporating this into a standard OS can enable many devices to be able to automatically detect or discover each other and establish communications, with little to no effort on the part of the user and with relatively low power or resource consumption. The communications can also be standards-based so that they are supported by a wide variety of devices. This can be useful for various other situations as well, such as in hospital rooms where a number of monitoring devices can all communicate concurrently, as well as with a device being utilized by a doctor or other such entity. In at least one embodiment a doctor can walk into a patient's room that the doctor has never previously been in, and automatically have his or her device communicate with various monitoring devices for a patient without the need to discover or set up communications with these various devices. Such an approach can provide for discovery of the various devices.

As mentioned, the various embodiments can be implemented as a system that includes one or more tracking devices for a given user. In other embodiments the embodiments may be provided as a service, which users can utilize for their devices. Other tracker providers may also subscribe or utilize such a service for their customers. In some embodiments an application programming interface (API) or other such interface may be exposed that enables collected body data, and other information, to be received to the service, which can process the information and send the results back down to the tracker, or related computing device, for access by the user. In some embodiments at least some of the processing may be done on the tracking or computing device itself, but processing by a remote system or service may allow for more robust processing, particularly for tracking devices with limited capacity or processing capability.

Figure 6A:
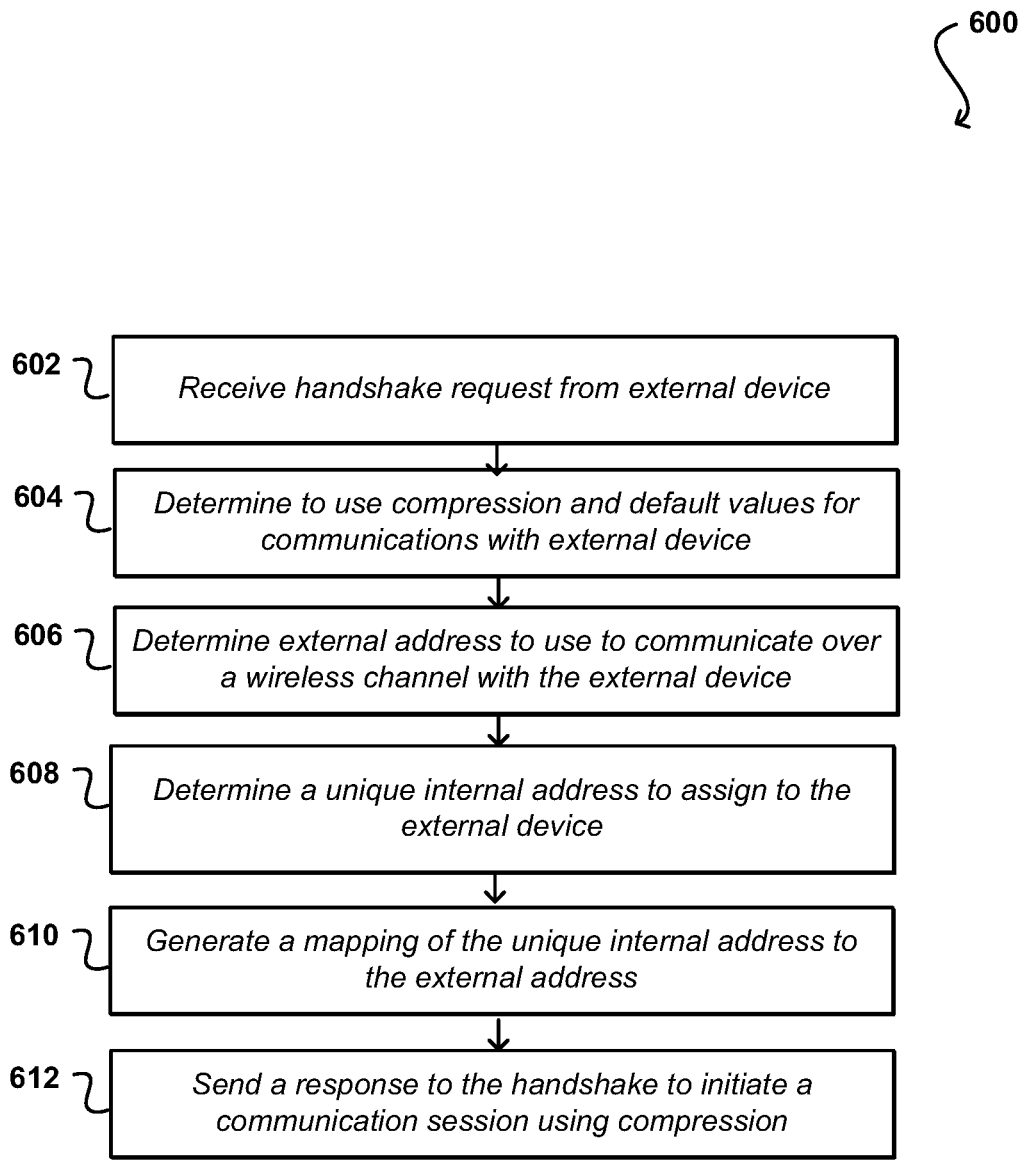
FIGS. 6A, 6B, and 6C illustrate portions of an example process for managing addresses for communications with one or more external devices that can be utilized in accordance with various embodiments.
Figure 6B:
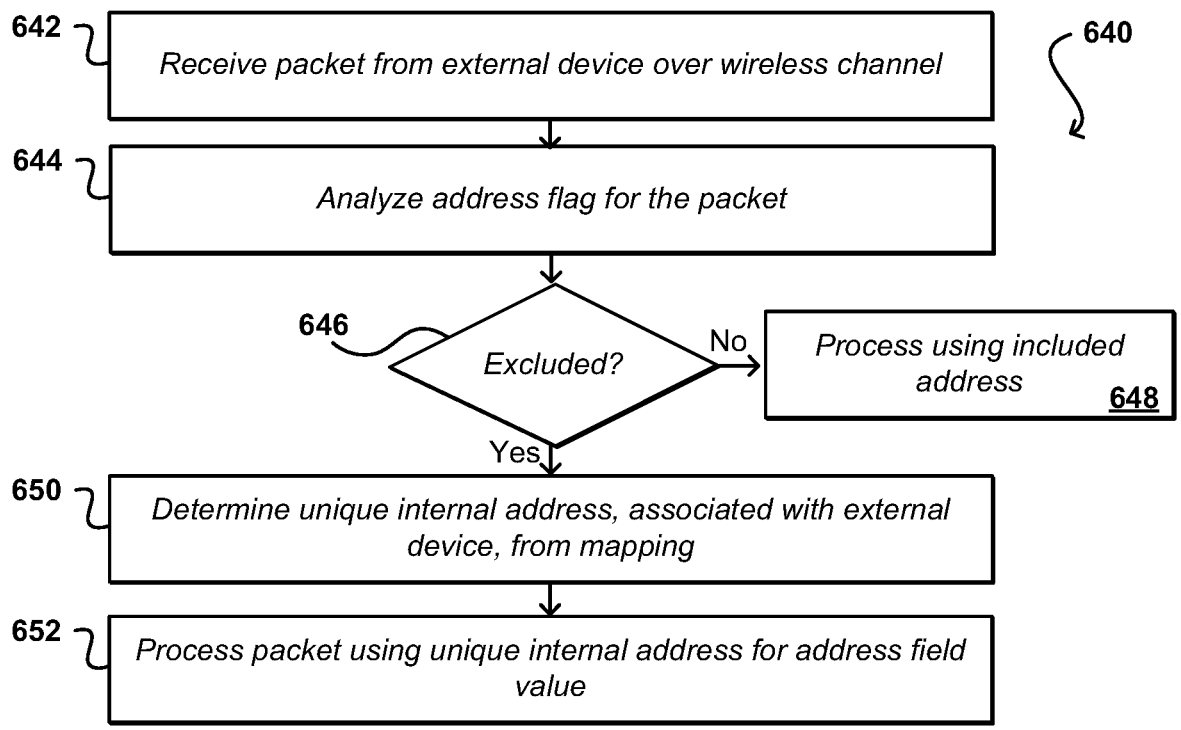
Figure 6C:
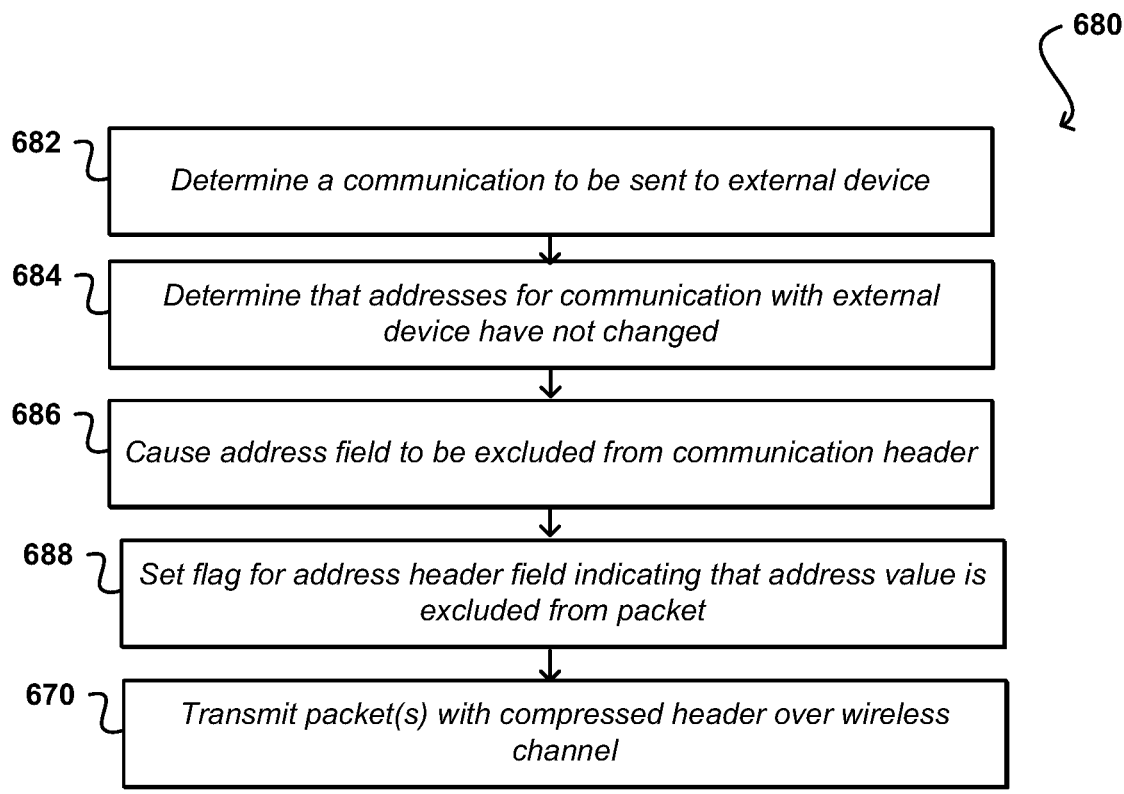

FIGS. 6A, 6B, and 6C illustrate portions 600, 640, 680 of an example process for managing addresses for multiple device communication that can be utilized in accordance with at least one embodiment. In this example, a handshake request is received 602 from an external device, although in at least one embodiment the present device could have initiated the handshake as well. It can be determined 604 to use header compression and default values for communication with the external device. An external address for the external device can be determined 606 that is to be used for communicating with the external device over a determined wireless channel, which as mentioned herein may not otherwise allow for concurrent sessions in at least one embodiment. For such concurrent sessions, the external addresses may be the same external address. A unique internal address can also be determined 608 to be assigned to the external device. The unique internal address will enable applications executing on the device, for example, to send communications targeted to specific external devices, and have received communications associated with the corresponding external device. A mapping of the external address to the unique internal address can be generated 610, such as by adding a new entry into a table of mappings for one or more other external devices. A response to the handshake can be sent 612 to initiate a communication session with the external device that uses header compression and default values as discussed herein.

FIG. 6B illustrates another portion 640 of the example process. In this example, a packet of information is received 642 from an external device over a wireless channel. This may be, for example, a communication on a session such as that established in FIG. 6A. An address flag for the packet can be analyzed 644, such as by checking a corresponding bit in a compression string in the packet header. If an address field value was not excluded from the packet as corresponding to a default value then the packet can be processed 648 using the address value included in the header. If, however, an address value was excluded from the packet as corresponding to a default value, then the unique internal address associated with the external device can be determined 650 from an address translation map. The packet can then be processed 652 using the unique internal address for the address field value.

FIG. 6C another portion 680 of the example process. In this example, a communication is determined 682 that is to be sent to an external device. As mentioned, this may include receiving a communication from an application executing on the device to an API associated with wireless communications, among other such options. Information for the communication can be analyzed to determine 684 that an address for communication with the external device over a wireless channel has not changed, and corresponds to a default address value. The address field can then be caused 686 to be excluded from the communication header, and a flag for the address header can be set 688 to indicate that the address value is excluded from the packet and the default value should be used. The packet(s) for the communication can then be transmitted over the wireless channel to the external device, which is able to insert the appropriate default values into the packet for processing.

Figure 7:
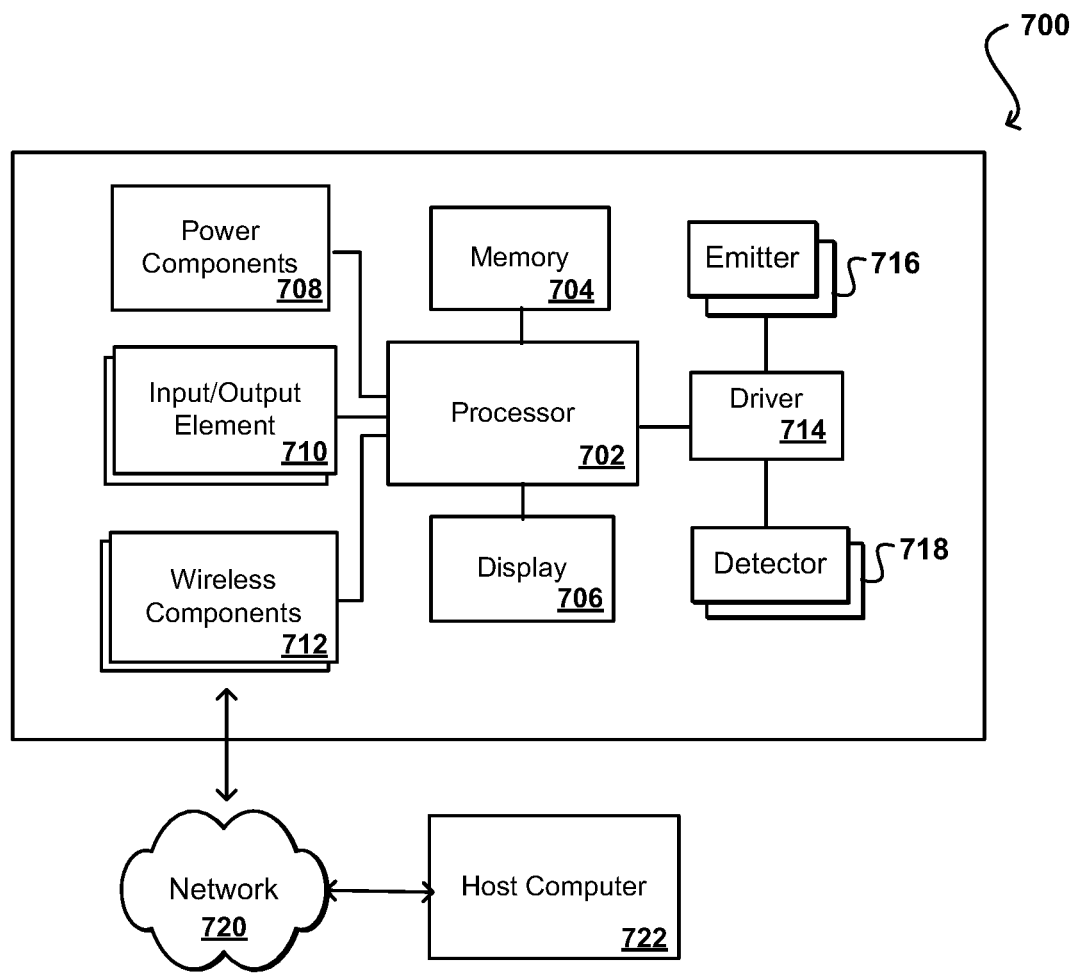
FIG. 7 illustrates an example environment in which aspects of various embodiments can be implemented.

FIG. 7 illustrates components of an example system 700 that can be utilized in accordance with various embodiments. In this example, the device includes at least one processor 702, such as a central processing unit (CPU) or graphics processing unit (GPU) for executing instructions that can be stored in a memory device 704, such as may include flash memory or DRAM, among other such options. As would be apparent to one of ordinary skill in the art, the device can include many types of memory, data storage, or computer-readable media, such as data storage for program instructions for execution by a processor. The same or separate storage can be used for images or data, a removable memory can be available for sharing information with other devices, and any number of communication approaches can be available for sharing with other devices. The device typically will include some type of display 706, such as a touch screen, organic light emitting diode (OLED), or liquid crystal display (LCD), although devices might convey information via other means, such as through audio speakers or projectors.

A tracker or similar device will include at least one motion detection sensor, which as illustrated can include at least one I/O element 710 of the device. Such a sensor can determine and/or detect orientation and/or movement of the device. Such an element can include, for example, an accelerometer, inertial sensor, altimeter, or gyroscope operable to detect movement (e.g., rotational movement, angular displacement, tilt, position, orientation, motion along a non-linear path, etc.) of the device. An orientation determining element can also include an electronic or digital compass, which can indicate a direction (e.g., north or south) in which the device is determined to be pointing (e.g., with respect to a primary axis or other such aspect). A device may also include an I/O element 710 for determining a location of the device (or the user of the device). Such a positioning element can include or comprise a GPS or similar location-determining element(s) operable to determine relative coordinates for a position of the device.

Positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination. The I/O elements may also include one or more biometric sensors, optical sensors, barometric sensors (e.g., altimeter, etc.), and the like.

As mentioned above, some embodiments use the element(s) to track the location and/or motion of a user. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. The example device also includes one or more wireless components 712 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art. The device also includes one or more power components 708, such as may include a battery operable to be recharged through conventional plug-in approaches, or through other approaches such as capacitive charging through proximity with a power mat or other such device. In some embodiments the device can include at least one additional input/output device 710 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As mentioned, many embodiments will include at least some combination of one or more emitters 716 and one or more detectors 718 for measuring data for one or more metrics of a human body, such as for a person wearing the tracker device. In some embodiments this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example device in FIG. 7 includes emitters 716 and detectors 618 capable of being used, in one example, for obtaining optical photoplethsymogram (PPG) measurements. Some PPG technologies rely on detecting light at a single spatial location, or adding signals taken from two or more spatial locations. Both of these approaches result in a single spatial measurement from which the heart rate (HR) estimate (or other physiological metrics) can be determined. In some embodiments, a PPG device employs a single light source coupled to a single detector (i.e., a single light path). Alternatively, a PPG device may employ multiple light sources coupled to a single detector or multiple detectors (i.e., two or more light paths). In other embodiments, a PPG device employs multiple detectors coupled to a single light source or multiple light sources (i.e., two or more light paths). In some cases, the light source(s) may be configured to emit one or more of green, red, and/or infrared light. For example, a PPG device may employ a single light source and two or more light detectors each configured to detect a specific wavelength or wavelength range. In some cases, each detector is configured to detect a different wavelength or wavelength range from one another. In other cases, two or more detectors configured to detect the same wavelength or wavelength range. In yet another case, one or more detectors configured to detect a specific wavelength or wavelength range different from one or more other detectors). In embodiments employing multiple light paths, the PPG device may determine an average of the signals resulting from the multiple light paths before determining an HR estimate or other physiological metrics. Such a PPG device may not be able to resolve individual light paths or separately utilize the individual signals resulting from the multiple light paths.

Referring back to FIG. 7, an example device may further comprise one or more processors 702 coupled to memory 704, a display 706, a bus, one or more input/output (I/O) elements 710, and wireless networking components 712, among other such options. A display and/or I/O devices may be omitted in certain embodiments. In an embodiment, the device is a wristband and the display is configured such that the display faces away from the outside of a user's wrist when the user wears the device. In other embodiments, the display may be omitted and data detected by the device may be transmitted using the wireless networking interface via near-field communication (NFC), Bluetooth, Wi-Fi, or other suitable wireless communication protocols over at least one network 720 to a host computer 722 for analysis, display, reporting, or other such use.

The memory 704 may comprise RAM, ROM, FLASH memory, or other non-transitory digital data storage, and may include a control program comprising sequences of instructions which, when loaded from the memory and executed using the processor 702, cause the processor 702 to perform the functions that are described herein. The emitters 716 and detectors 718 may be coupled to a bus directly or indirectly using driver circuitry by which the processor 702 may drive the light emitters 716 and obtain signals from the light detectors 718. The host computer 722 communicate with the wireless networking components 712 via one or more networks 720, which may include one or more local area networks, wide area networks, and/or internetworks using any of terrestrial or satellite links. In some embodiments, the host computer 722 executes control programs and/or application programs that are configured to perform some of the functions described herein.

In some embodiments, each emitter 716 can be individually controlled, or each light detector 718 can be individually read out when multiple detectors are used, and in such embodiments, PPG sensor data along several different light paths can be collected. The control program can utilize the collected data to provide a more accurate estimation or HR and/or other physiological metrics. In related aspects, the processor 702 and other component(s) of the PPG device may be implemented as a System-on-Chip (SoC) that may include one or more central processing unit (CPU) cores that use one or more reduced instruction set computing (RISC) instruction sets, and/or other software and hardware to support the PPG device.

In various embodiments, the emitters (or light sources) comprise electronic semiconductor light sources, such as LEDs, or produce light using any of filaments, phosphors, or laser. In some implementations, each of the light sources emits light having the same center wavelength or within the same wavelength range. In other cases, at least one light source may emit light having a center wavelength that is different from another one of the light sources. The center wavelengths of the light emitted by the light sources may be in the range of 495 nm to 570 nm. For example, a particular green light source may emit light with a center wavelength of 528 nm. In other embodiments, one or more of the light sources may emit red light (e.g., 660 nm center wavelength) or IR light (e.g., 940 nm center wavelength). In some embodiments, one or more of the light sources may emit light with peak wavelengths typically in the range of 650 nm to 940 nm. For example, in various embodiments, a particular red light source may emit light with a peak wavelength of 660 nm, and one or more infrared light sources may emit light with peak wavelengths in the range of 750 nm to 1700 nm. By way of example and not limitation, a particular infrared light source may emit light with a peak wavelength of 730 nm, 760 nm, 850 nm, 870 nm, or 940 nm. In some cases, commercial light sources such as LEDs may provide output at about 20 nm intervals with a center wavelength tolerance of +/−10 nm from the manufacturer's specified wavelength and thus one possible range of useful peak wavelengths for the light sources is 650 nm to 950 nm. The green light sources may be configured to emit light with wavelengths in the range of 495 nm to 570 nm. For example, a particular green light source may emit light with a wavelength of 528 nm. The green light sources may be equally spaced from light detectors as the pairs of red and infrared light sources. For example, if the distance between light detectors and a center of a first red light source is 2 mm, the distance between light detectors and a green light source may also be 2 mm (e.g., equidistant). In some other cases, the distance between the light detectors and one or more light sources is not equidistant. Further, in some embodiments, one or more of the light sources may comprise a single LED package that emits multiple wavelengths, such as green, red and infrared wavelengths, at the same or substantially the same (e.g., less than 1 mm difference) location with respect to multiple detectors. Such LEDs may include multiple semiconductor elements co-located using a single die in a single package.

The spacing of the light sources may be measured from the side of the light source or the center of the light source. For example, the light sources may be configured such that the center of each light source is at a first distance from the edge of the closest one of the light detectors. In some embodiments, the first distance may be 2 mm. In some implementations, each light source is located at a second distance from the closest one of the light sources, and each light detector is located at a third distance from the closest one of the light detectors. In some embodiments, the second and third distances are identical to the first distance. In other embodiments, each of the second and third distances is different from the first distance. The second distance may be identical to or different from the third distance. The particular magnitude of the spacing may depend on a number of factors and this disclosure does not limit the embodiments to any particular spacing. For example, spacing in a range of 1 mm (or less) to 10 mm would be workable in various embodiments.

In some embodiments, independent control of all light sources is provided. In other embodiments, several light sources are controlled together as a gang or bank. A benefit of independent control of each light source, or independent readout from each of multiple detectors (e.g., obtaining independent signals based on the same or different light wavelengths from each of multiple detectors), is that a multiple light path approach may be used to improve the estimation of HR and/or other physiological metrics, as discussed further herein.

Light detectors may comprise one or more sensors that are adapted to detect wavelengths of light emitted from the light sources. A particular light source combined with a particular detector may comprise a sensor such as a PPG sensor. A first PPG sensor and a second PPG sensor can share components, such as the same light sources and/or detectors, or have different components and thus the term "PPG sensor," in addition to having its ordinary meaning, may refer to any of such arrangements although actual embodiments may use multiple components in implementing a PPG sensor. The term "PPG device," in addition to having its ordinary meaning, may refer to a device including a PPG sensor. A light detector, in an embodiment, may comprise one or more detectors for detecting each different wavelength of light that is used by the light sources. For example, a first detector may be configured to detect light with a wavelength of 560 nm, a second detector may be configured to detect light with a wavelength of 940 nm, and a third detector may be configured to detect light with a wavelength of 528 nm. Examples include photodiodes fabricated from semiconductor materials and having optical filters that admit only light of a particular wavelength or range of wavelengths. The light detectors may comprise any of a photodiode, phototransistor, charge-coupled device (CCD), thermopile detector, microbolometer, or complementary metal-oxide-semiconductor (CMOS) sensor. The light detectors may comprise multiple detector elements, as further described herein. One or more of the detectors may comprise a bandpass filter circuit.

In other embodiments, a detector may comprise one or more detectors configured to detect multiple wavelengths of light. For example, a single detector may be configured to tune to different frequencies based on data received from an electrical digital microprocessor coupled to detectors. In another way, the single detector may include multiple active areas where each active area is sensitive to a given range of wavelengths. In an embodiment, a single detector is configured to detect light with wavelengths in the red and IR frequencies and a second detector is configured to detect light with wavelengths in the green frequencies. Further, each of the light sources may use any of one or more different wavelengths of light as previously described.

In an embodiment, light detectors can be mounted in a housing with one or more filters that are configured to filter out wavelengths of light other than wavelengths emitted by light sources. For example, a portion of the housing may be covered with a filter which removes ambient light other than light in wavelengths emitted by light sources. For example, signals from light sources may be received at the light detectors through an ambient light filter that filters out an ambient light source that generates an ambient light with a wavelength that is different from the wavelength that is detected by the detector. Although LEDs and photodiodes are used as examples of the light sources and the light detectors, respectively, the techniques described herein may be extended to other types of light sources. For example, edge emitting lasers, surface emitting lasers, LED-pumped phosphors that generate broadband light. The techniques described herein may be extended to other combinations of light sources and detectors. For example, the PPG device may include (i) single or multiple LEDs and a multi-element photodetector (e.g., a camera sensor), (ii) an LED array and single or multiple photodiodes, (iii) a broadband LED-pumped phosphor and detector array with wavelength selective filters on each detector, (iv) spatial light modulator (SLM) (e.g., a digital micromirror device [DMD] or a liquid crystal on silicon [LCoS] device) and single or multiple LEDs, other combinations thereof, or other configurations of light sources and detectors.

Certain flow diagrams are presented herein to illustrate various methods that may be performed by example embodiments. The flow diagrams illustrate example algorithms that may be programmed, using any suitable programming environment or language, to create machine code capable of execution by a CPU or microcontroller of the PPG device. In other words, the flow diagrams, together with the written description in this document, are disclosures of algorithms for aspects of the claimed subject matter, presented at the same level of detail that is normally used for communication of this subject matter among skilled persons in the art to which the disclosure pertains. Various embodiments may be coded using assembly, C, OBJECTIVE-C, C++, JAVA, or other human-readable languages and then compiled, assembled, or otherwise transformed into machine code that can be loaded into ROM, EPROM, or other recordable memory of the activity monitoring apparatus that is coupled to the CPU or microcontroller and then then executed by the CPU or microcontroller.

In an embodiment, signals obtained from multiple light paths may be processed to filter or reject signal components that are associated with motion of the user, using a computer program to identify the motion component of the signal and remove the identified motion component from the composite signal, leaving the cardiac component as a remainder or final signal.

In an embodiment, signals might be collected in variety of activities during day or at night, such as may relate to periods of walking, exercise, or sleep. Other on-device sensors including an accelerometer, gyroscope, or altimeter may be used to categorize or detect the activity, or human posture as a basis to develop the appropriate filters. These filters or signal processing methods might be used for targeted reduction of variability in the PPG data with multiple light paths. As an example and not limitation, the accelerometer data can be used to develop signal processing methods to filter the data and look into a certain posture, removing other body orientations. This can help reduce the noise in the data and get a better assessment of the corresponding physiological variables for the corresponding light paths.

In various embodiments, approaches discussed herein may be performed by one or more of: firmware operating on a monitoring or tracker device or a secondary device, such as a mobile device paired to the monitoring device, a server, host computer, and the like. For example, the monitoring device may execute operations relating to generating signals that are uploaded or otherwise communicated to a server that performs operations for removing the motion components and creating a final estimate value for HR, $SpO_2$, and/or other physiological metrics. Alternatively, the monitoring device may execute operations relating to generating the monitoring signals and removing the motion components to produce a final estimate value for HR, $SpO_2$, and/or other physiological metrics local to the monitoring device. In this case, the final estimate may be uploaded or otherwise communicated to a server such as host computer that performs other operations using the value.

An example monitoring or tracker device can collect one or more types of physiological and/or environmental data from one or more sensor(s) and/or external devices and communicate or relay such information to other devices (e.g., host computer or another server), thus permitting the collected data to be viewed, for example, using a web browser or network-based application. For example, while being worn by the user, a tracker device may perform biometric monitoring via calculating and storing the user's step count using one or more sensor(s). The tracker device may transmit data representative of the user's step count to an account on a web service (e.g., www.fitbit.com), computer, mobile phone, and/or health station where the data may be stored, processed, and/or visualized by the user. The tracker device may measure or calculate other physiological metric(s) in addition to, or in place of, the user's step count. Such physiological metric(s) may include, but are not limited to: energy expenditure, e.g., calorie burn; floors climbed and/or descended; HR; heartbeat waveform; HR variability; HR recovery; respiration, $SpO_2$, blood volume, blood glucose, skin moisture and skin pigmentation level, location and/or heading (e.g., via a GPS, global navigation satellite system (GLONASS), or a similar system); elevation; ambulatory speed and/or distance traveled; swimming lap count; swimming stroke type and count detected; bicycle distance and/or speed; blood glucose; skin conduction; skin and/or body temperature; muscle state measured via electromyography; brain activity as measured by electroencephalography; weight; body fat; caloric intake; nutritional intake from food; medication intake; sleep periods (e.g., clock time, sleep phases, sleep quality and/or duration); pH levels; hydration levels; respiration rate; and/or other physiological metrics.

An example tracker or monitoring device may also measure or calculate metrics related to the environment around the user (e.g., with one or more environmental sensor(s)), such as, for example, barometric pressure, weather conditions (e.g., temperature, humidity, pollen count, air quality, rain/snow conditions, wind speed), light exposure (e.g., ambient light, ultra-violet (UV) light exposure, time and/or duration spent in darkness), noise exposure, radiation exposure, and/or magnetic field. Furthermore, a tracker device (and/or the host computer and/or another server) may collect data from one or more sensors of the device, and may calculate metrics derived from such data. For example, a tracker device may calculate the user's stress or relaxation levels based on a combination of HR variability, skin conduction, noise pollution, and/or sleep quality. In another example, a tracker device may determine the efficacy of a medical intervention, for example, based on a combination of data relating to medication intake, sleep, and/or activity. In yet another example, a tracker device may determine the efficacy of an allergy medication based on a combination of data relating to pollen levels, medication intake, sleep and/or activity. These examples are provided for illustration only and are not intended to be limiting or exhaustive.

An example monitoring device may include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. A monitoring system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
receiving data to be transmitted to a recipient device over a wireless channel for a communication session;
determining a set of values to be included in header fields for packets to transmit the data;
determining that a subset of values for the header fields match corresponding default values for respective header fields;
causing the header fields for the subset of values to be excluded from the packets;

setting flags in headers of the packets to indicate which of the header fields are excluded from the packets; and transmitting the packets to the recipient device, wherein the recipient device is enabled to determine from the flags which header fields were excluded from the packets and utilize the default values for the excluded fields.

2. The computer-implemented method of claim 1, further comprising:

determining, during a handshake process initiating the communication session, to utilize compression for header fields having associated default values.

3. The computer-implemented method of claim 1, further comprising:

determining an external address for communicating with the recipient device, the external address capable of being used concurrently for communication with at least a second external device;

determining a unique internal address for the recipient device; and generating a mapping of the external address to the unique internal address.

4. The computer-implemented method of claim 3, further comprising:

receiving a packet having an address field excluded as indicated by a corresponding flag in the packet; and using a default address value for the address field, the default address value capable of being the external address or the unique internal address depending in part upon a recipient of the packet.

5. The computer-implemented method of claim 3, further comprising:

enabling, through the mapping of the external address to the unique internal address, the recipient device and the second external device to concurrently host sessions on the wireless channel independent of whether the wireless channel supports connections to multiple devices.

6. The computer-implemented method of claim 1, further comprising:

allocating the data to a plurality of packets, the packets having a minimum transmission size, the allocation determined based in part upon a compression of at least a subset of the packets.

7. The computer-implemented method of claim 1, further comprising:

determining the default values using at least one of agreed-upon values, previously-sent values, or expected values for the corresponding header fields.

8. The computer-implemented method of claim 1, wherein the wireless channel is a Bluetooth® Low Energy (BLE) channel.

9. The computer-implemented method of claim 1, wherein the wireless channel supports bi-directional communication with the recipient device.

10. A device, comprising:

at least one processor; and memory including instructions that, when executed by the at least one processor, cause the device to:

determine data to be transmitted to a second device over a wireless channel;

determine that one or more values, to be included in header fields for packets to transmit the data, correspond to default values for the respective header fields;

cause the header fields for the one or more values to be excluded from the packets;

provide an indication, in headers of the packets, as to which of the header fields are included in the packets; and transmit the packets to the second device, wherein the second device is enabled to determine excluded header fields and utilize the default values for the excluded header fields.

11. The device of claim 10, wherein the instructions when executed further cause the device to:

determine an external address for communicating with the second device, the external address capable of being used concurrently for at least a third device;

determine a unique internal address for the second device; and generate a mapping of the external address to the unique internal address.

12. The device of claim 11, wherein the instructions when executed further cause the device to:

receive a packet having an address field excluded as indicated by a corresponding flag in the packet; and use a default address value for the address field, the default address value capable of being the external address or the unique internal address depending in part upon a recipient of the packet.

13. The device of claim 11, wherein the instructions when executed further cause the device to:

enable, through the mapping of the external address to the unique internal address, the second device and the third device to concurrently host sessions on the wireless channel independent of whether the wireless channel supports connections to multiple devices.

14. The device of claim 10, wherein the instructions when executed further cause the device to:

allocate the data to a plurality of packets, the packets having a minimum transmission size, the allocation determined based in part upon a compression of at least a subset of the packets.

15. The device of claim 10, wherein the wireless channel supports bi-directional communication with the second device.

16. A non-transitory and non-volatile computer-readable storage medium including instructions that, when executed by at least one processor, cause the at least one processor to:

determine data to be transmitted to a second device;

determine that one or more values, to be included in header fields for packets to transmit the data, correspond to default values for the respective header fields;

cause the header fields for the one or more values to be excluded from the packets;

provide an indication, in headers of the packets, as to which of the header fields are at least one of included in, or excluded from, the packets; and transmit the packets to the second device, wherein the second device is enabled to utilize the default values for the excluded header fields.

17. The non-transitory and non-volatile computer-readable storage medium of claim 16, wherein the instructions when executed further cause the at least one processor to:

determine an external address for communicating with the second device, the external address capable of being used concurrently for at least a third device;

determine a unique internal address for the second device; and generate a mapping of the external address to the unique internal address.

18. The non-transitory and non-volatile computer-readable storage medium of claim 17, wherein the instructions when executed further cause the at least one processor to:
  receive a packet having an address field excluded as indicated by a corresponding flag in the packet; and
  use a default address value for the address field, the default address value capable of being the external address or the unique internal address depending in part upon a recipient of the packet.

19. The non-transitory and non-volatile computer-readable storage medium of claim 16, wherein the instructions when executed further cause the at least one processor to:
  enable, through the mapping of the external address to the unique internal address, the second device and the third device to concurrently host sessions on the wireless channel independent of whether the wireless channel supports connections to multiple devices.

20. The non-transitory and non-volatile computer-readable storage medium of claim 16, wherein the instructions when executed further cause the at least one processor to:
  allocate the data to a plurality of packets, the packets having a minimum transmission size, the allocation determined based in part upon a compression of at least a subset of the packets.

* * * * *